US008936387B2

(12) United States Patent
Venot et al.

(10) Patent No.: US 8,936,387 B2
(45) Date of Patent: Jan. 20, 2015

(54) HAND MIXER

(71) Applicant: MASTRAD, S.A., Paris (FR)

(72) Inventors: Marc Venot, Saint Oeun (FR); Mathieu Lion, Paris (FR)

(73) Assignee: MASTRAD, S.A., Paris (FR)

( * ) Notice: Subject to any disclaimer, the term of this patent is extended or adjusted under 35 U.S.C. 154(b) by 188 days.

(21) Appl. No.: 13/834,204

(22) Filed: Mar. 15, 2013

(65) Prior Publication Data

US 2014/0269152 A1 Sep. 18, 2014

(51) Int. Cl.
*A47J 43/044* (2006.01)
*B01F 13/10* (2006.01)

(52) U.S. Cl.
CPC .................................... *B01F 13/10* (2013.01)
USPC ........................................ 366/129; 366/243

(58) Field of Classification Search
CPC ............................................ A47J 2043/04427
USPC ......................................... 366/129, 130, 243
See application file for complete search history.

(56) References Cited

U.S. PATENT DOCUMENTS

| | | | | |
|---|---|---|---|---|
| 440,547 | A * | 4/1889 | Crafton | 366/243 |
| 1,237,585 | A * | 8/1917 | Roberts | 366/243 |
| 1,238,461 | A * | 8/1917 | Tripke | 366/243 |
| 1,415,334 | A * | 5/1922 | Gibson | 416/65 |
| 2,749,098 | A * | 6/1956 | Johnson | 366/243 |
| 2008/0179334 | A1* | 7/2008 | Abramson et al. | 220/568 |

* cited by examiner

*Primary Examiner* — David Sorkin
(74) *Attorney, Agent, or Firm* — Novak Druce Connolly Bove + Quigg LLP

(57) ABSTRACT

A hand mixer includes a container with an open end closed by a head. A passageway through the head receives a screw slidable through but rotationally engaged with the passageway. A handle is rotationally mounted on one end of the screw. A mixer wheel is fixed to the other end of the screw in the container. The mixer wheel includes a hub with two sets of blades. Both sets extend radially and each is inclined away from the other. Rings are disposed at the distal ends of each of the sets of blades. Stops at the bottom of the container and at the underside of the head limit the stroke of the wheel. The bottom end of the container receives a skid resistant cover. A conical flange extends outwardly and away from the open end of the cylindrical container. Charging passages selectively accessible extend fully about the head.

10 Claims, 1 Drawing Sheet

HAND MIXER

BACKGROUND OF THE INVENTION

The field of the present invention is hand operated mixing devices.

The culinary arts employ colloidal suspension for various ingredients and dishes. Such suspensions include immiscible liquid/gas suspensions and liquid/liquid suspensions which may be generated by mixing. Such colloids can be either stable or unstable and may include emulsifiers such as lecithin found in egg yoke. Examples of air/liquid colloids, sometimes referred to as culinary foam, include whipped cream, meringue, mousse and foamed milk. Colloidal emulsions of two immiscible liquids include vinaigrettes and mayonnaise. Other ingredients not forming a principal part of the suspension and typically in smaller amounts are also frequently added to the mix and become entrained in the resulting suspension, such as herbs, garlic and shallots to name a few. These other ingredients can be fragile and easily smashed, making mixing to a colloidal suspension of concern.

The creation of culinary foam and culinary emulsions from immiscible ingredients typically include more or less vigorous mixing. Many devices are available for use in the culinary arts to input energy into an immiscible combination to achieve either a culinary foam or emulsion. All such mixing seems to include mixing energy and time. With more efficient mixing, time can be reduced.

SUMMARY OF THE INVENTION

The present invention is directed to a hand mixer including a container with an open end which is closed by a functional head. The head includes a central passageway receiving an elongate screw. The screw is able to slide through the central passageway in the head but is rotationally engaged with the passageway. A handle is rotationally mounted on one end of the elongate screw. The handle enables an operator to force the screw up and down through the passageway. This causes the screw to both translate and rotate. A mixer wheel is fixed to the other end of the elongate screw in the container.

In a first separate aspect of the present invention, the mixer wheel includes a hub with two sets of blades. Both sets extend radially and each is inclined away from the other. Rings are disposed at the distal ends of each of the sets of blades. The rings extend to the container wall with a clearance fit. By forcing the handle up and down relative to the container, the mixer wheel may be vigorously rotated and translated within the container to efficiently mix ingredients to create culinary foams and emulsions.

The device of this first aspect of the invention may be arranged to include stops at the bottom of the container and at the underside of the head. The bottom of the container may extend inwardly to engage the hub of the mixer wheel at one end of its stroke to operate as a stop. This extension may also include a conical surface which can be closely approached by one set of blades with a clearance fit to sweep the ingredients at the end of the container. The head may include an annular surface to receive the ring associated with the other set of blades to limit stroke in the other direction.

A cover may advantageously be retained on the closed end of the container. The cover may have a skid resistant surface. A knob can be included on the other side of the cover which can be stored in the cavity formed by the inwardly extending bottom of the container. This cover may then be removed and used to close the open end of the container when the head is removed.

In a second separate aspect of the present invention, the hand mixer of the present invention includes a conical flange extending outwardly and away from the open end of the cylindrical container. This flange facilitates charging of the container with the head positioned in the open end. The head includes a threaded portion to engage the container, an annular seal about the head and charging passages fully about the head between the annular seal and the threaded portion. This arrangement provide for the introduction of ingredients poured into the conical flange with the head partially separated from its fully sealed position in the container. The ingredients pass through the charging passageways. The head can then be returned to the sealed position and mixing initiated or resumed.

In a third separate aspect of the present invention, any of the foregoing aspects and features can be combined to greater advantage.

Accordingly, it is a principal object of the present invention to provide a hand mixer capable of facilely creating culinary foams and emulsions. Other and further objects and advantages will appear hereinafter.

DETAILED DESCRIPTION OF THE PREFERRED EMBODIMENT

Figure 1:
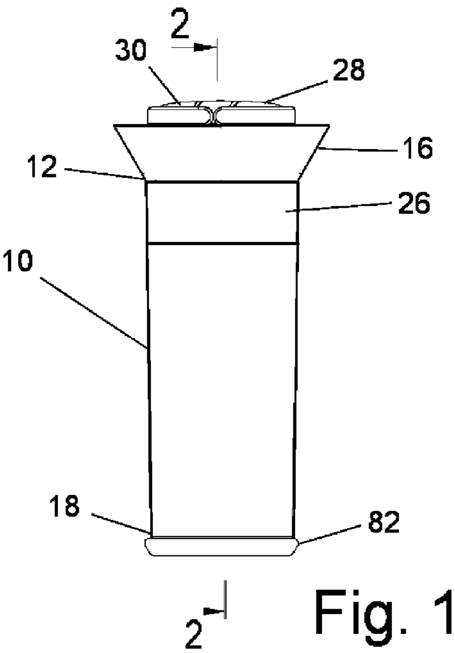
FIG. 1 is a side view of a hand mixer.
Figure 2:
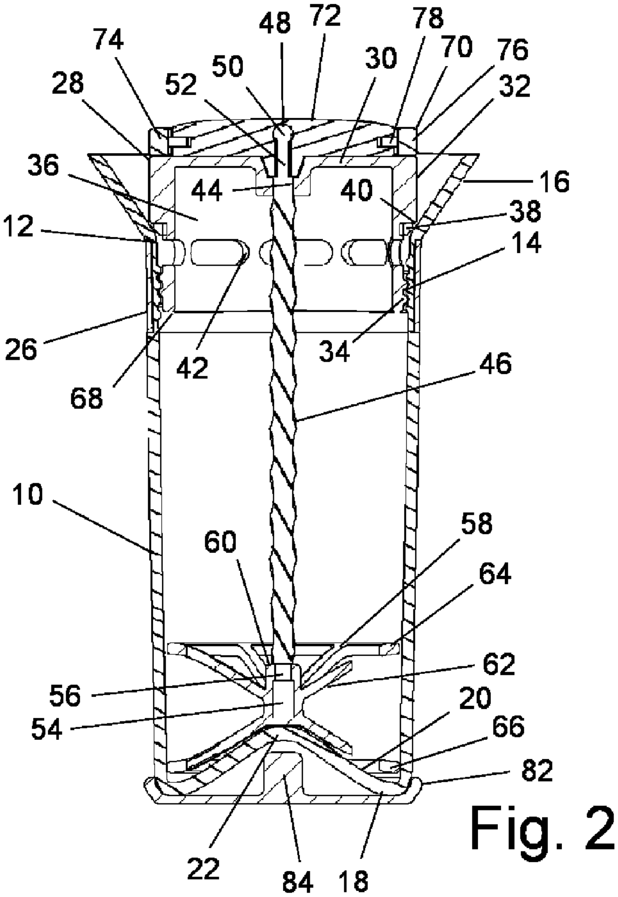
FIG. 2 is a cross section of the hand mixer of FIG. 1 taken alone line 2-2.
Figure 3:
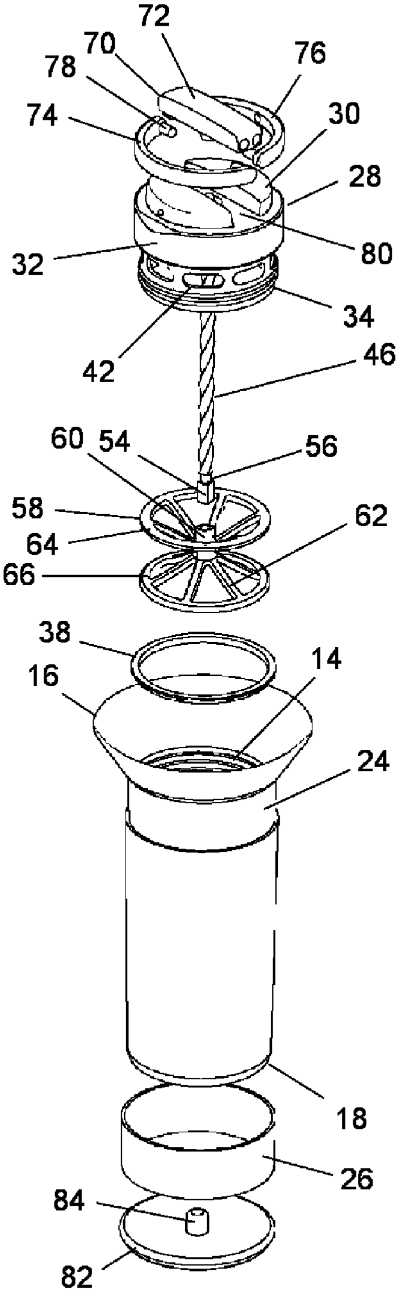
FIG. 3 is an exploded assembly perspective view of the hand mixer.

Turning in detail to the figures, a hand mixer is illustrated which includes a cylindrical container 10. The cylindrical container 10 is conveniently of circular cross section in the preferred embodiment. Other cross sections work as the efficient mixer wheel described below is capable of generating sufficient mixing independently of the side wall. The cylindrical container 10 includes an open end 12 with internal threads 14 inwardly of the open end 12. A conical flange 16 extends outwardly and away from the open end 12 fully about the cylindrical container 10. The other end of the circular container 10 is closed. The closed end 18 extends centrally inwardly with a conical surface 20 to a rounded apex 22. An annular inset 24 about the cylindrical container 10 receives a silicone ring 26 to insure sufficient manual purchase of the container 10 even when wet or oily.

A head 28 closing the open end 12 of the container 10 is also nominally cylindrical. The head 28 includes a top 30 with a circular cylindrical skirt 32. The cylindrical skirt 32 has external threads 34 to be engaged with the internal threads 14 of the cylindrical container 10 at the open end 12. The head 28 has an internal cavity 36 which opens into the interior of the cylindrical container 10 with the mixer assembled.

The skirt 32 of the head 28 is arranged for charging the container 10 with the head 28 engaging the container 10. An annular seal 38 is positioned about the head 28 against a shoulder 40. The head 28 above the annular seal 38 may be slightly larger in diameter than the interior diameter of the cylindrical container 10 and the external threads 34. In this way, the shoulder 40 is provided to support the annular seal 38 in sealing against the open end 12 of the container 10 when the head 28 is fully threaded onto the container 10. Charging passages 42 are arranged fully about the skirt 32 between the external threads 34 and the annular seal 38. Because the interior of the head 28 is open to the interior of the cylindrical container 10, the charging passages 42 communicate with the container 10. As the head 28 is unthreaded from the container 10, the charging passages 42 are exposed to an area above the open end 12 of the container 10 and in communication with the interior of the conical flange 16. With the head so displaced, ingredients can be poured at any position about the mixer into the conical flange 16 so as to pass through the charging passages 42 into the interior of the container 10.

The head 28 also includes a central passageway 44 which is square in cross section and spirals through its length. An elongate screw 46 is positioned in the central passageway 44 and is square in cross section along the majority of its length to engage the central passageway 44. With the square cross section also forming a matching spiral to that of the central passageway 44, the elongate screw 46 is able to translate through the central passageway 44 and at the same time rotationally engage the passageway 44. As such, movement of the elongate screw 46 through the central passageway 44 causes the screw to rotate back and forth as it moves up and down.

A first end 48 of the elongate screw 46 extends outwardly through the head 28. This first end 48 has a spherical element 50 with a reduced cylindrical shaft 52 extending to the central portion of the screw 46 with the square cross section. The other end of the elongate screw 46 includes a boss 54 with a smaller neck 56 extending to the central portion of the elongate screw 46 with the square cross section.

A mixer wheel 58 is fixed to the end of the elongate screw 46 which is on the container side of the head 28. The wheel 58 includes a hub 60 molded in situ about the boss 54 of the elongate screw 46. The boss 54 is preferably not cylindrical such that the hub 60 will not come free to rotate independently of the boss 54 during operation.

The mixer wheel 58 includes two sets of blades 62 with six blades illustrated in each set. The blades 62 have a square cross section. One set of the blades 62 extends radially and is inclined toward the head 28. The other set of blades 62 also extends radially but is inclined away from the head 28. The blades 62 of the two sets extend to rings 64, 66, respectively, at the distal ends of the blades 62.

The rounded apex 22 of the inwardly extending closed end 18 acts as a stop when the hub 60 of the mixer wheel encounters the apex 22 at the lower end of its stroke. At this end of the mixer wheel stroke, the set of blades 62 inclined away from the head 28 extends along the conical surface 20 of the inwardly extending closed end 18 with a clearance fit. The blades 62 are thus able to mix liquid accumulated at the bottom of the container 10. The ring 66 most adjacent the closed end 18 of the container 10 also reaches the closed end 18 with a clearance fit when the hub 60 encounters the rounded apex 22 of the closed end 18.

The ring 64 inclined away from the closed end 18 encounters the head 28 at the upper end of the stroke of the mixer wheel 58. The head 28 includes an annular surface 68 to receive the ring 64 to act as a stop at the end of the stroke.

A handle assembly 70 is provided at the top of the head 28. The handle assembly 70 includes a handle support 72 which is rotationally mounted to the first end 48 of the elongate screw 46. The spherical element 50 is captured within the handle support 72. The handle support 72 is formed in two parts with matching cavities which capture the spherical element 50 when the two parts are permanently joined about the first end of the elongate screw 46. Handle grips 74, 76, semicircular in plan, include pins 78 at the ends of each grip 74, 76 which fit within holes at the ends of the handle support 72. This allows pivotal movement of the handle grips 74, 76 from a position together for operation or positions which are opposed and lying against the head 28 for storage. In the position together, the handles give manual purchase for screwing and unscrewing the head 28 on the container 10. A slot 80 on the upper surface of the head 28 receives the handle support 72 while the periphery of the top 30 of the head 28 accommodates the handle grips 74, 76 when in the stored position.

A cover 82 can be positioned on the closed end 18 of the cylindrical container 10. This cover 82 may be of silicone or other food grade material to offer a skid resistant surface to the bottom of the hand mixer. The cover 82 may be retained on the bottom of the container 10 by an interference fit with the closed end 18. As the cover 82 is flexible, it may be manipulated during application by forcing the center of the cover 82 toward the container 10 such that when the periphery thereof engages the closed end 18, a vacuum will form as the center of the cover 82 is released. A knob 84 is located on the inner surface of the cover 82 and extends centrally inwardly toward the closed end 18 when the cover 82 is positioned on the closed end 18.

The outer diameter of the cover 82 is such that it also fits at the base of the conical flange 16 at the other end of the cylindrical container 10. If the head 28 is removed, the cover 82 may be removed from the closed end 18 and placed in the open end 12 of the container 10. The knob 84 then is available for manual purchase such that the mixer can satisfy storage requirements without the need to manipulate the head 28 for access to the contents.

In operation, the head 28 may be disassembled from the cylindrical container 10 to charge the container. Alternatively, the container 10 may be charged or additionally charged through the charging passages 42 with the head 28 partially unthreaded from the container 10. Once charged, the head 28 may be fully engaged with the container 10, causing the annular seal 38 to seal the periphery of the head 28 against the open end 12 of the container 10. The handle grips 74, 76 are pivotally moved together at the gripping position. The handle 70, elongate screw 46 and wheel 58 may then be rapidly forced in and out of the container 10. The full stroke is defined by as the stops provided by the rounded apex 22 at the bottom of the container 10 and the annular surface 68 on the head 28. Under this action, the screw 46 is caused to rotate by the rotational engagement with the passageway 44 in the head 28. This in turn rotates and translates the mixer wheel 58.

The rotation mixes the immiscible liquids or air and liquid phases in the container 10. The translation of the wheel 58 enhances the interaction between liquids of differing specific gravity or liquids and air and allows mixing at all levels within the container 10. The stops provided by the rounded apex 22 and the annular surface 68 provide a full range within the container 10 for mixing and facilitate the manual operation, allowing the operator to drive fully to each end of the stroke.

The combination of translation and rotation enhances mixing and efficiency. Additionally, the mixer wheel 58 design has been found to provide specific advantage. In a cylinder of circular cross section, it sweeps the entire volume but for only clearance fit. The mixer wheel 58 includes surfaces perpendicular to the axis of the cylinder to vertically mix ingredients as the mixer wheel 58 is driven up and down. The thin blades 62 with significant surface discontinuities appear to also aid mixing. Small solids entrained in the ingredients, at the same time, do not appear to get smashed.

During the emulsifying or foaming mixing process, the operation of the wheel 58 may be suspended. The head 28 can then be partially unscrewed from the container 10 for the addition of more ingredients through the charging passages 42, facilitated by the conical flange 16. In fact, the head 28 can be unscrewed so precisely that added ingredients can be added to the mix drop by drop. In this, the conical flange 16 can become a reservoir as mixing continues with slow addition of an ingredient to the mix. The head at the other extreme can also be conventionally fully removed for easy and quick charging. The head 28 is then screwed back into place on the container to again engage the annular seal 38. Mixing can then be resumed.

During the mixing operation it is advantageous to have the silicone ring 26 and the cover 82 in place to hold and stabilize the mixer while manually applying reciprocal action to foam or emulsify the contents of the container 10. Once the operation is complete, the head 28 may be unscrewed from the container 10. The cover 82 can be removed from the closed end 18 of the container 10 and then placed on the open end 12 for storage and convenient use.

Accordingly, a convenient and effective hand mixer for culinary foams and emulsions has been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A hand mixer comprising a cylindrical container of circular cross section including an open end;

a head engageable with the cylindrical container at the open end, the head including a central passageway therethrough;

an elongate screw slidably extending through the passageway and rotationally engaging the passageway;

a handle rotationally mounted to a first end of the screw outwardly of the container;

a mixer wheel including a hub fixed to a second end of the screw inwardly of the container, first blades extending radially and inclined toward the first end of the screw, second blades extending radially and inclined away from the first end of the screw, a first ring at distal ends of the first blades, and a second ring at distal ends of the second blades, the first and second rings extending to the cylindrical container with a clearance fit.

2. The hand mixer of claim 1, the head further including an annular surface engageable with the first ring as a stop.

3. The hand mixer of claim 1, a closed end of the cylinder extending centrally inwardly and engageable with the hub as a stop.

4. The hand mixer of claim 3, the closed end of the cylinder having a conical surface, the second blades extending along the conical surface with a clearance fit with the closed end engaged with the hub.

5. The hand mixer of claim 1, the shaft and the passageway both being square in cross section for rotational engagement therebetween.

6. The hand mixer of claim 1, the first and second blades being square in cross section.

7. The hand mixer of claim 1, the handle including a handle support and two handle grips pivotally engaging the handle support, the handle support being rotationally mounted to the first end of the screw, the handle grips pivotally movable from a gripping position together to opposed storage positions about a periphery of the head.

8. The hand mixer of claim 1 further comprising a cover retainable on the closed end of the container and having a skid resistant surface on one side and a knob for manual purchase on the other side, the closed end of the container extending centrally inwardly and receiving the knob with the cover on the closed end, the cover selectively closing the container at the open end with the knob accessible when the head is removed.

9. A hand mixer comprising a cylindrical container of circular cross section including an open end and a closed end extending centrally inwardly;

a head engageable with the cylindrical container at the open end, the head including a central passageway therethrough and an annular surface facing the cylinder;

an elongate screw slidably extending through the passageway and rotationally engaging the passageway;

a handle rotationally mounted to a first end of the screw outwardly of the container;

a mixer wheel including a hub fixed to a second end of the screw inwardly of the container, first blades extending radially and inclined toward the first end of the screw, second blades extending radially and inclined away from the first end of the screw, a first ring at distal ends of the first blades, and a second ring at distal ends of the second blades, the first and second rings extending to the cylindrical container with a clearance fit, the annular surface of the head being engageable with the first ring as a stop, the closed end of the cylinder extending centrally inwardly and engageable with the hub as a stop and having a conical surface, the second blades extending along the conical surface with a clearance fit with the closed end engaged with the hub.

10. A hand mixer comprising a cylindrical container of circular cross section including an open end, internal threads inwardly of the open end and a conical flange extending outwardly and away from the open end fully about the open end;

a head engageable with the cylindrical container at the open end, the head including a central passageway therethrough, external threads engageable with the internal threads of the cylindrical container, an annular seal outwardly of the open end and charging passages fully about the head between the seal and the external threads;

an elongate screw slidably extending through the passageway and rotationally engaging the passageway;

a handle rotationally mounted to a first end of the screw outwardly of the container;

a mixer wheel fixed to a second end of the screw inwardly of the container.

* * * * *